(12) United States Patent
Qi

(10) Patent No.: US 12,003,823 B2
(45) Date of Patent: Jun. 4, 2024

(54) SMART CHANNEL DEVICE

(71) Applicant: DIRECTV, LLC, El Segundo, CA (US)

(72) Inventor: Kevin T. Qi, Redondo Beach, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

(21) Appl. No.: 17/574,343

(22) Filed: Jan. 12, 2022

(65) Prior Publication Data

US 2022/0217446 A1 Jul. 7, 2022

Related U.S. Application Data

(63) Continuation of application No. 16/579,913, filed on Sep. 24, 2019, now Pat. No. 11,259,095, which is a
(Continued)

(51) Int. Cl.
*H04N 21/482* (2011.01)
*G06F 16/735* (2019.01)
*G06F 16/78* (2019.01)
*H04N 21/41* (2011.01)
*H04N 21/422* (2011.01)
(Continued)

(52) U.S. Cl.
CPC ....... *H04N 21/4826* (2013.01); *G06F 16/735* (2019.01); *G06F 16/78* (2019.01); *H04N 21/4126* (2013.01); *H04N 21/41265* (2020.08); *H04N 21/42204* (2013.01);
(Continued)

(58) Field of Classification Search
CPC ........... H04N 21/4826; H04N 21/4126; H04N 21/41265; H04N 21/42204; H04N 21/4383; H04N 21/4532; H04N 21/4821; H04N 21/4882; G06F 16/735; G06F 16/78
See application file for complete search history.

(56) References Cited

U.S. PATENT DOCUMENTS

| 5,973,683 A | 10/1999 | Cragun et al. |
| 8,069,461 B2 | 11/2011 | Angiolillo et al. |

(Continued)

OTHER PUBLICATIONS

United States Patent and Trademark Office, "Non-Final Office Action," issued in connection with U.S. Appl. No. 15/427,538, dated Jan. 23, 2018, 11 pages.
(Continued)

*Primary Examiner* — Nathan J Flynn
*Assistant Examiner* — Christine A Kurien
(74) *Attorney, Agent, or Firm* — HANLEY, FLIGHT & ZIMMERMAN, LLC

(57) ABSTRACT

According to one embodiment, a channel device includes a memory, an interface, and a processor. The memory stores a watch list. The watch list includes n predetermined number of channels, wherein n is an integer and the predetermined number of channels are ranked from one to n. The interface is configured to receive program information for a first channel, wherein the first channel is a channel of a watch list. The processor is further configured to determine a change from a previous channel to a current channel. The processor dynamically updates the watch list to include the previous channel, wherein the previous channel is ranked as one. The processor removes the channel ranked as n from the watch list.

24 Claims, 4 Drawing Sheets

Related U.S. Application Data continuation of application No. 15/427,538, filed on Feb. 8, 2017, now Pat. No. 10,462,527.

(51) Int. Cl.
| | | |
|---|---|---|
| *H04N 21/438* | (2011.01) | |
| *H04N 21/45* | (2011.01) | |
| *H04N 21/488* | (2011.01) | |

(52) U.S. Cl.
CPC ..... *H04N 21/4383* (2013.01); *H04N 21/4532* (2013.01); *H04N 21/4821* (2013.01); *H04N 21/4882* (2013.01)

(56) References Cited

U.S. PATENT DOCUMENTS

| | | | |
|---|---|---|---|
| 8,589,975 | B2 | 11/2013 | McKissick et al. |
| 10,462,527 | B2 | 10/2019 | Qi |
| 11,259,095 | B2 | 2/2022 | Qi |
| 2002/0059610 | A1 | 5/2002 | Ellis |
| 2002/0073422 | A1 | 6/2002 | Lee |
| 2003/0084448 | A1 | 5/2003 | Soundararajan |
| 2004/0177384 | A1 | 9/2004 | Kahn |
| 2004/0205815 | A1 | 10/2004 | Hwang |
| 2008/0209474 | A1 | 8/2008 | Pjanovic et al. |
| 2008/0256574 | A1* | 10/2008 | Lee ................... H04H 20/18 725/39 |
| 2010/0071004 | A1* | 3/2010 | Wightman ......... H04N 21/4383 725/46 |
| 2010/0107194 | A1* | 4/2010 | McKissick ......... H04N 21/4882 725/40 |
| 2011/0107374 | A1 | 5/2011 | Roberts et al. |
| 2013/0247101 | A1 | 9/2013 | Uchida et al. |
| 2016/0088359 | A1 | 3/2016 | Vaidhyanathan et al. |
| 2016/0198213 | A1* | 7/2016 | Kim .................. H04N 21/42222 725/41 |
| 2017/0064390 | A1* | 3/2017 | Kannan ............... H04N 21/4668 |
| 2017/0255696 | A1* | 9/2017 | Pulitzer ................ H04W 4/021 |
| 2018/0227639 | A1 | 8/2018 | Qi |
| 2020/0021891 | A1 | 1/2020 | Qi |

OTHER PUBLICATIONS

United States Patent and Trademark Office, "Final Office Action," issued in connection with U.S. Appl. No. 15/427,538, dated Jul. 18, 2018, 10 pages.

United States Patent and Trademark Office, "Non-Final Office Action," issued in connection with U.S. Appl. No. 15/427,538, dated Nov. 13, 2018, 11 pages.

United States Patent and Trademark Office, "Notice of Allowance," issued in connection with U.S. Appl. No. 15/427,538, dated Jun. 19, 2019, 7 pages.

United States Patent and Trademark Office, "Non-Final Office Action, " issued in connection with U.S. Appl. No. 16/579,913, dated Apr. 2, 2020, 15 pages.

United States Patent and Trademark Office, "Final Office Action," issued in connection with U.S. Appl. No. 16/579,913, dated Oct. 15, 2020, 16 pages.

United States Patent and Trademark Office, "Non-Final Office Action," issued in connection with U.S. Appl. No. 16/579,913, dated May 14, 2021, 17 pages.

United States Patent and Trademark Office, "Notice of Allowance," issued in connection with U.S. Appl. No. 16/579,913, dated Oct. 12, 2021, 7 pages.

* cited by examiner

| RANK | CHANNEL NUMBER | CHANNEL NAME |
|---|---|---|
| 1 | 17 | XYZ CHANNEL |
| 2 | 123 | LMN CHANNEL |
| ⋮ | ⋮ | ⋮ |
| n | 115 | BCD CHANNEL |

*FIG. 2*

SMART CHANNEL DEVICE

RELATED APPLICATION

This patent arises from a continuation of U.S. patent application Ser. No. 16/579,913, (now U.S. Pat. No. 11,259,095) which was filed on Sep. 24, 2019, which is a continuation of U.S. patent application Ser. No. 15/427,538, (now U.S. Pat. No. 10,462,527) which was filed on Feb. 8, 2017. U.S. patent application Ser. No. 16/579,913 and U.S. patent application Ser. No. 15/427,538 are hereby incorporated herein by reference in their entirety. Priority to U.S. patent application Ser. No. 16/579,913 and U.S. patent application Ser. No. 15/427,538 are hereby claimed.

TECHNICAL FIELD

The present disclosure relates generally to program viewing systems and more particularly to a smart channel device.

BACKGROUND

Users watch multiple channels using a program viewing device. For example, a user may switch between a plurality of channels during a viewing session. Switching between multiple channels may lead to a user missing at least part of a scheduled program. For example, a user may switch channels and fail to return to the initial channel before a scheduled program begins. The conventional approach fails to notify a user when programming is scheduled to begin.

SUMMARY

In one embodiment, a channel device includes a memory, an interface, and a processor. The memory stores a watch list. The watch list includes n predetermined number of channels, wherein n is an integer and the predetermined number of channels are ranked from one to n. The interface is configured to receive program information for a first channel, wherein the first channel is a channel of a watch list. The processor is further configured to determine a change from a previous channel to a current channel. The processor dynamically updates the watch list to include the previous channel, wherein the previous channel is ranked as one. The processor removes the channel ranked as n from the watch list.

In another embodiment, a method includes storing a watch list comprising n predetermined number of channels, wherein n is an integer. The predetermined number of channels are ranked from one to n. The method further includes receiving program information for a first channel, wherein the first channel is a first channel of a watch list. The method further includes determining a change from a previous channel to a current channel. The method further includes dynamically updating the watch list to include the previous channel, wherein the previous channel is ranked as one. The method further includes removing the channel ranked as n from the watch list.

The present disclosure presents several technical advantages. In one embodiment, a viewing system communicates notifications to a user before a program of interest is scheduled to begin, thus reducing or eliminating the problem of displaying programs that are of less interest to the user. A problem inherent with program viewing systems is that users often "channel surf" (i.e., scroll through channels). As users are channel surfing, the user may lose track of time and/or forget to tune in to a scheduled program. The unconventional approach contemplated in this disclosures reduces or eliminates this problem inherent in viewing systems by providing notifications to users before a program of interest is scheduled to begin.

In an embodiment, a set-top box stores and dynamically revises a list of channels that may be of interest to a user. Conventional systems lack the capability to communicate the most relevant notifications to a user because conventional systems fail to dynamically update a channel list to include the most relevant channels. The unconventional approach contemplated in this disclosure provides more relevant notifications to users, thus reducing or eliminating the problem of a user missing desired programming. The approach provides more relevant notifications by dynamically revising a channel list as a user changes channels during a viewing session. This allows the channel list to be up to date with channels that may interest a user. Dynamically revising and storing the channel list allows the system contemplated in this disclosure to communicate more relevant notifications to the user based on the more relevant channels in the channel list.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts in which:

FIG. 2 illustrates the watch list of the system of FIG. 1, in certain embodiments;

DETAILED DESCRIPTION

Providing relevant programming notifications presents several technical challenges. As a user views programming, the user may scroll through a plurality of channels. For example, a user may watch a program on a first channel, but then cycle through additional channels when, for example, a commercial is shown on the first channel. As another example, a user may attempt to watch two or more programs at a single time, switching between the channels showing the programs. As the user attempts to view two or more programming channels during a single viewing session, the user may lose track of time and/or the programs scheduled to air on certain channels. Thus, a user may unintentionally fail to view one or more n programs. The conventional approach may provide programming schedule for a user to view. However, the user may not continuously view the schedule and may not realize when a scheduled program is about to begin.

This disclosure contemplates providing dynamic notifications indicating that one or more programs is about to begin. In the unconventional approach, a channel device, such as a set-top box, obtains a watch list. The watch list includes channels that are most relevant to a user. For example, the watch list may include channels that are watched most often or watched for the longest period of time. As a user is scrolling through channels, the channels that the user views are added to the watch list. This reduces or eliminates the problems inherent in viewing system by maintaining and revising a list of channels that are most relevant to a user.

Furthermore, notifications are communicated to the user to indicate that a program on one or the programming channels of the watch list is about to begin. The channel device monitors the channels on the watch list to determine when a program on one of the channels is scheduled to begin. Shortly before a program is scheduled to begin, the channel device generates a notification to communicate to the user. This reduces or eliminates missing scheduled programs an inherent problem of viewing systems.

Figure 1:
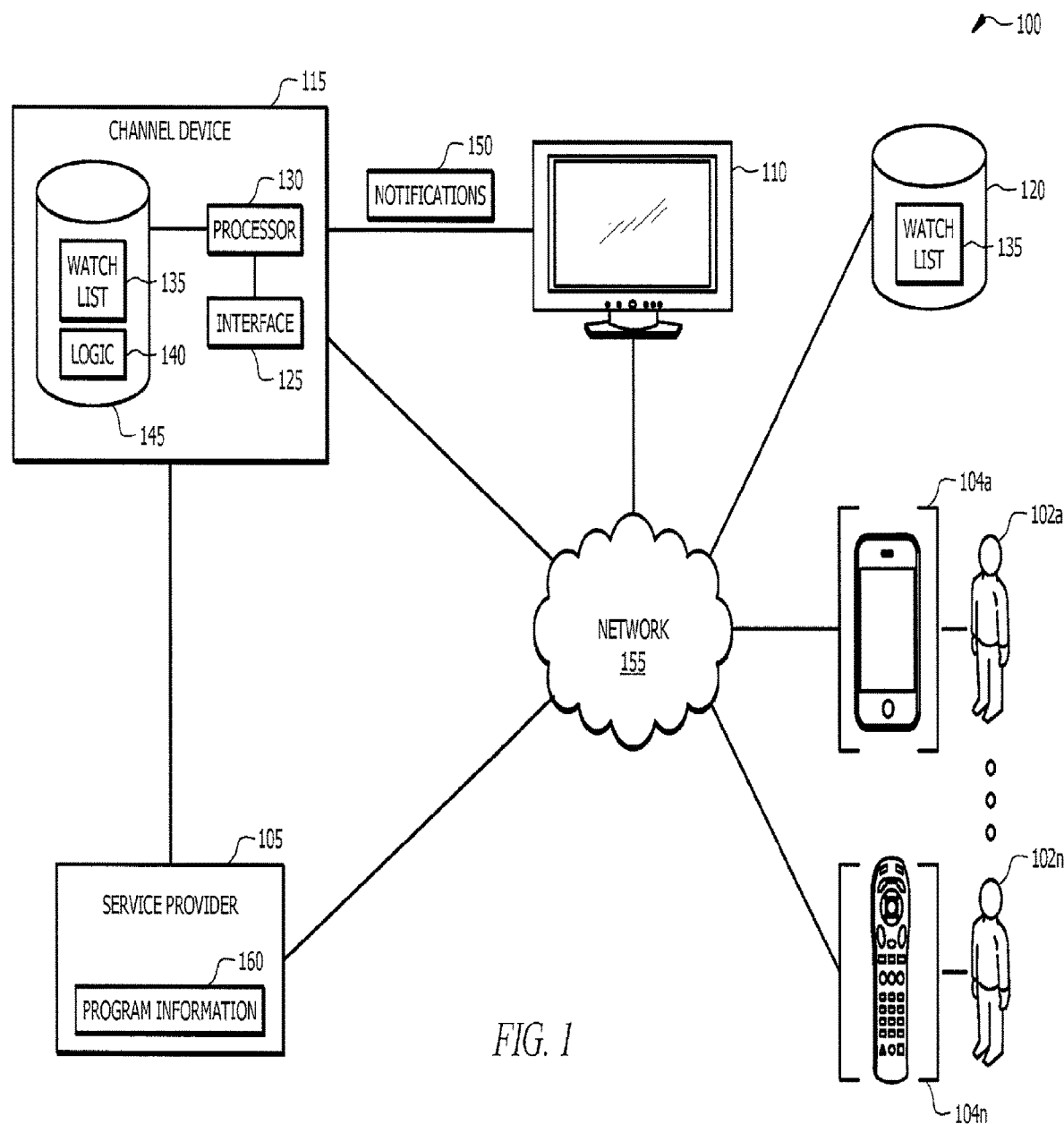
FIG. 1 illustrates a system for communicating program notifications.

FIG. 1 illustrates a system 100 configured to communicate program notifications. Generally, system 100 maintains and revises watch list 135 and communicates notifications 150 to user 102. As illustrated in FIG. 1, system 100 includes one or more users 102, one or more user devices 104, service provider 105, display 110, channel device 115, network database 120, and network 155. User 102 may utilize system 100 to view programming and information associated with programming. In particular embodiments, system 100 communicates notifications 150 to user 102 via display 110.

In the illustrated embodiment, system 100 includes users 102a-n. System 100 may include one user 102 or any suitable number of users 102. User 102 generally uses system 100 to view programming. For example, user 102 may be a subscriber such as a cable and/or satellite subscriber, a family member of a subscriber, a friend of a subscriber, or other suitable person who utilizes system 100 to view programming.

As shown in FIG. 1, user 102 may be associated with user device 104. System 100 may include a single user device 104 or any suitable number of user devices 104. In some embodiments, each user 102 is associated with a user device 104. In other embodiments, a plurality of users 102 are associated with a single user device 104. User device 104 may be any device that operates and/or communicates with other components of system 100 regarding program viewing. User 102 generally uses user device 104 to communicate commands or otherwise provide input to channel device 115 and/or display 110. This disclosure contemplates user device 104 communicating directly with channel device 115 and/or display 110. For example, user device 104 may communicate with channel device 115 and/or display 110 using radio frequency signals, infrared signals, Bluetooth, and/or any other signaling technology and/or protocol. As another example, user device 104 may communicate with components of system 100 through network 155.

As an example and not by way of limitation, user device 104 may be a remote control, such as a universal remote or any other type of remote, a computer, a laptop, a wireless or cellular telephone, an electronic notebook, a personal digital assistant, a tablet, or any other device capable of receiving and/or communicating information with other components of system 100. User device 104 may also include a user interface, such as a keypad, a display, a microphone, or other appropriate terminal equipment usable by user 102. In some embodiments, an application executed by user device 104 may perform the functions described herein.

Service provider 105 generally communicates program information 160 to channel device 115. For example, service provider 105 may communicate program information 160 to channel device 115 via network 155. In some embodiments, service provider 105 communicates program information 160 directly to channel device 115. For example, service provider 105 communicates program information 160 to channel device 115 via radio frequency signals transmitted through coaxial cables, in some embodiments. Service provider 105 may communicate program information 160 via light pulses through fiber-optic cables, over the air radio waves, through network 155 (e.g., through the internet or telephone network), or any other suitable means of transmission.

Program information 160 generally includes information for programming channels. For example, program information 160 may include audio and/or video information for displaying a program. Program information 160 may include a schedule of programs for one or more program channels, the title of one or more programs, images associated with one or more programs, watch list 135, and/or any other suitable information to facilitate viewing programming via display 110.

Network 155 facilitates communication between and amongst the various components of system 100. This disclosure contemplates network 155 being any suitable network operable to facilitate communication between the components of system 100. Network 155 may include any interconnecting system capable of transmitting audio, video, signals, data, messages, or any combination of the preceding. Network 155 may include all or a portion of a public switched telephone network (PSTN), a public or private data network, a local area network (LAN), a metropolitan area network (MAN), a wide area network (WAN), a cloud network, a local, regional, or global communication or computer network, such as the Internet, a wireline or wireless network, an enterprise intranet, or any other suitable communication link, including combinations thereof, operable to facilitate communication between the components.

Channel device 115 is generally a device that receives input and generates audio and/or video output for display by display 110. For example, channel device 115 may receive radio frequency analog television input, digital television input, satellite television input, and/or any other suitable type of input that contains program information 160. Channel device 115 may receive program information 160 from service provider 105. In some embodiments, channel device 115 converts the input into audio and/or video signals, which can be used to produce sound and picture. Channel device 115 may be or comprise a set-top box, a ultra high frequency (UHF) converter, a cable converter box, a closed captioning box, a digital television adapter, an integrated receiver/decoder, a hybrid box, and/or an Internet Protocol Television (IPTV) receiver. Channel device 115 may be any suitable device that receives program information 160 and sends information to display 110 for display. In the illustrated embodiment, channel device 115 includes interface 125, processor 130, and memory 145.

Interface 125 represents any suitable device operable to receive information from network 155, transmit information through network 155, perform suitable processing of the information, communicate with components of system 100 and/or other devices, or any combination of the preceding. For example, interface 125 transmits data to display 110. As another example, interface 125 receives information from service provider 105. As a further example, interface 125 transmits data to—and receives data from—network database 120. Interface 125 represents any port or connection, real or virtual, including any suitable hardware and/or software, including protocol conversion and data processing capabilities, to communicate through a LAN, WAN, or other communication systems that allows channel device 115 to exchange information with service provider 105, network database 120, display 110, and/or other components of system 100 directly or via network 155. Interface 125 is not limited to a single interface and may encompass multiple interfaces.

Processor 130 is any electronic circuitry, including, but not limited to microprocessors, application specific integrated circuits (ASIC), application specific instruction set processor (ASIP), and/or state machines, that communicatively couples to memory 145 and interface 125 and controls the operation of channel device 115. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 145 and executes them by directing the coordinated operations of the ALU, registers and other components. Processor 130 may include other hardware and software that operates to control and process information. Processor 130 executes software stored on memory 145 to perform any of the functions described herein. Processor 130 controls the operation and administration of channel device 115 by processing information received from network 155, service provider 105, network database 120, memory 145, and/or any other suitable component of system 100. Processor 130 may be a programmable logic device, a microcontroller, a microprocessor, any suitable processing device, or any suitable combination of the preceding. Processor 130 is not limited to a single processing device and may encompass multiple processing devices.

Memory 145 may store, either permanently or temporarily, data, operational software, or other information for processor 130. Memory 145 may be a computer-readable non-transitory storage medium, in some embodiments. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 130 to perform one or more of the functions described herein. In particular embodiments, memory 145 may store logic 140, watch list 135, and/or any other suitable information. This disclosure contemplates memory 145 storing any of the elements stored in database 120, user device 104, display 110, and/or any other suitable components of system 100.

Memory 145 may include logic 140. Logic 140 generally refers to logic, rules, algorithms, codes, tables, and/or other suitable instructions embodied in a computer-readable storage medium for operation of channel device 115. For example, logic 140 may include rules and/or other instructions to facilitate dynamically revising watch list 135.

Watch list 135 is generally a list of programming channels. Service provider 105 may provide information to channel device 115 for one or more programming channels. User 102 may tune into one or more of the programming channels over a period of time. In some embodiments, watch list 135 includes a list of programming channels that may be of interest to one or more users 102. For example, watch list 135 may include a list of programming channels that are most watched using channel device 115. For example, watch list 135 may include a list of programming channels that are watched most frequently, watched for the longest period of time, watched most consistently, and/or any other parameter to indicate that the programming channels may be of interest to one or more users 102. Programming channels in watch list 135 may be associated with a ranking. For example, each channel may be associated with a numerical ranking (e.g., 1-10), an alphanumerical ranking (e.g., a-z), or any other suitable ranking. A higher ranking may indicate that a programming channel is watched more often, for a longer length, or more recently. Watch list 135 may include any suitable number of programming channels. For example, watch list 135 may include 1, 3, 5, 10, or 100 channels. In some embodiments, watch list 135 is associated with channel device 115. In these embodiments, watch list 135 may include relevant shows for multiple users 102 that use the same channel device 115. In some embodiments, watch list 135 may be associated with a particular user 102. Channel device 115 may dynamically update or otherwise revise watch list 135 while one or more users are utilizing channel device 115 to watch programming. For example, and as discussed in more detail below, channel device 115 may modify watch list 135 as a user 102 switches between programming channels (e.g., by using user device 104).

Channel device 115 generates and communicates notifications 150 to display 110, in some embodiments. Display 110 generally displays notifications 150. Notifications 150 generally notify user 102 of information associated with one or more programming channels. In some embodiments, the predetermined time is a default time. For example, the default time may be 1 minute, 3 minutes, 5 minutes, or any suitable time period. In some embodiments, user 102 may set the predetermined time using user device 104. For example, notifications 150 may indicate that a program is going to begin in a predetermined amount of time on a programming channel. In some embodiments, notifications 150 may include a request for input from user 102. Notifications 150 may allow a user 102 to select commands using user device 104. Commands a include a command to dismiss notification 150, to change programming channels, to record a program, and/or any other suitable type of command. Notification 150 may include an image associated with a program. In some embodiments notification 150 may include a video associated with a program. For example, notification 150 may include a live stream of a program. Information associated with notifications 150 may be stored using memory 145 and/or database 120. Notification 150 is discussed in more detail in FIG. 3.

Display 110 generally receives audio and/or video information from channel device 115 and outputs the audio and/or video information for viewing by one or more users 102. Display 110 may be any device capable of displaying audio and/or video information. For example and not by way of limitation, display 110 may be a television, a smart television, a computer monitor, a smart phone, a desktop, a laptop, a projector, an augmented reality device, a virtual reality device, or any other suitable type of device having a display.

System 100 may include database 120, which stores data. In the illustrated embodiment, database 120 stores watch list 135. Database 120 may store watch list 135 in addition to channel device 115. In some embodiments, database 120 may store watch list in lieu of channel device 115. Database 120 may be a network database, in some embodiments.

Database 120 may include any one or a combination of volatile or non-volatile local or remote devices suitable for storing information. For example, database may include RAM, ROM, magnetic storage devices, optical storage devices, or any other suitable information storage device or a combination of these devices. This disclosure contemplates database 120 storing any of the elements stored in channel device 115, display 110, service provider 105, user device 104, and/or any other suitable components of system 100. In some embodiments, database 120 is located within service provider 105. Database 120 may be located in any suitable component of system 100 and/or any other suitable location.

In a first exemplary embodiment of operation, channel device 115 determines information associated with programming channels on watch list 135 and communicates notifications 150 to display 110. For example, channel device 115 receives a programming schedule for each channel in watch list 135 from service provider 105. Channel device 115 determines when a program is scheduled to begin for each of the programming channels on watch list 135. At the predetermined time before a program is scheduled to begin, channel device 115 communicates a notification 150 to display 110.

In some embodiments, a plurality of programming channels on watch list 135 may begin scheduled programming at the same time or near the same time (e.g., within 1, 2, or 5 minutes). For example, watch list 135 may include three programming channels, channel 1, channel 2, and channel 3. Each channel may be scheduled to begin a program at the same time. For example, channel 1, channel 2, and channel 3, may be scheduled to begin program 1, program 2, and program 3, respectively, at the same time (e.g., 7:00 p.m.). In this embodiment, channel device 115 may generate three notifications 150 at the predetermined amount of time before 7:00 p.m. (e.g., 6:57 p.m.).

In an embodiment, display 110 may display a single notification 150 at a time. For example, when channel device 115 generates three notifications 150a-c, display 110 may display only one of the notifications at any given time. For example, display 110 may display a single notification 150. As another example, display 110 may cycle through a plurality of notifications 150. In some embodiments, notification 150 associated with a programming channel of the highest ranking is displayed before notifications 150 associated with programming channels of lower rankings. For example, if channel 1 is ranked higher than channel 2, notification 150a for channel 1 is displayed before notification 150b for channel 2. In another embodiment, display 110 may display a plurality of notifications 150 at a single time.

Display 110 displays notification 150a. Notification 150a may solicit input from user 102. For example, notification 150a may include an option to dismiss notification 150a. In this example, user 102 may use user device 104 to communicate a command to dismiss notification 150a to channel device 115 and/or display 110. Once user 102 communicates a command to dismiss notification 150a, display 110 may display notification 150b. User 102 may dismiss notification 150b, as discussed, and display 110 will display notification 150c. In some embodiments, notification 150 may be automatically dismissed after a predetermined period of time if no input is received from user 102. Notifications 150 are discussed in more detail in relation to FIG. 3.

Modifications, additions, or omissions may be made to system 100 without departing from the scope of the disclosure. For example, system 100 may include any number of processors 130, memory 145, user devices 104, and/or databases 120. Furthermore, the components of system 100 may be integrated or separated. For example, in particular implementations, memory 145 may be separated into multiple memories 145 to store the data descried herein. As another example, channel device 115 may be located within service provider 105. As shown as the components of system 100 communicating through network 155, any component of system 100 may communicate directly with any other component.

FIG. 2 is an example illustration of watch list 135. In certain embodiments, user 102 may view watch list while in other embodiments user 102 may not view watch list 135. Watch list 135 may be in any suitable format that allows for channel device 115 to access information regarding a user's 102 viewing history and facilitates providing relevant notifications to user 102. Watch list 135 includes ranking 205, channel number 210, and channel name 215. In some embodiments, watch list 135 may include only one of channel number 210 and channel name 215. This disclosure contemplates watch list 135 including two, three, five, ten, or any suitable number of channel numbers 210 and their associated channel names 215. Rank 205 generally indicates a ranking associated with a programming channel relative to other programming channels in watch list 135. As discussed, rank 205 indicates how often and/or how recently a programming channel is watched. Channel number 210 represents a number associated with a programming channel. For example, each programming channel associated with service provider 105 has a particular number for viewing content on the programming channel. For example, the XYZ programming channel may be associated with channel number 17. Channel name 215 indicates a name of a programming channel or network. Generally each programming channel associated with service provider 105 has a name. Channel name 215 indicates the name. As seen in the illustrated embodiment, watch list 135 includes one or more programming channels associated each associated with a ranking. Watch list 135 may be in any particular format that includes programming channels and ranks the channels.

In a second exemplary embodiment, user 102 powers on channel device 115 using user device 104. Channel device 115 obtains watch list 135 from database 120 and/or memory 145. In this, embodiment, watch list 135 initially includes three programming channels, channel 1, channel 2, and channel 3, ranked a, b, and c, respectively. An example table of watch list 135 is shown below:

| Rank | Channel |
|------|---------|
| a    | 1       |
| b    | 2       |
| C    | 3       |

As an example, user 102 begins viewing a first programming channel, channel 4. User 102 may navigate to channel 4 from a home screen or channel 4 may be automatically displayed when user 102 powers on channel device 115 using user device 104.

User 102 may then switch the programming channel to a second channel, channel 2 using user device 104. When user 102 switches to channel 2, channel device 115 determines whether the immediate previously viewed channel, channel 4, is in watch list 135. Upon a determination that channel 4 is not within watch list 135, channel device 115 adds channel 4 to watch list 135. Because channel 4 was the immediate previously viewed channel, channel device 115 assigns channel 4 the highest ranking, i.e., the rank 205 of a in this example. Each other channel in watch list 135 is moved down one rank except for the lowest ranked channel. The lowest ranked channel, channel 3 in this example, is removed from watch list 135. Thus, watch list 135 maintains three channel numbers in this embodiment. As previously discussed, watch list 135 may include any suitable number of channels. An example table of watch list 135 after user switches from channel 4 to channel 5 is show below:

| Rank | Channel |
|------|---------|
| a    | 4       |
| b    | 1       |
| c    | 2       |

After a period of time, user 102 uses device 104 to switch the programming channel from channel 2 to channel 5. When the programming channel is changed, channel device 115 determines whether the immediate previous channel (i.e., channel 2) is in watch list 135. Upon a determination that channel 2 is in watch list 135, channel device 115 changes the rank 205 of channel 2 to the highest rank 205, i.e., the rank of "a." Channel device 115 moves the rank 205 of each other programming channel in watch list 135 down one level. An example table of watch list 135 after user 102 switches from channel 2 to channel 5 is shown below:

| Rank | Channel |
|------|---------|
| a    | 2       |
| b    | 4       |
| C    | 1       |

After a period of time, user 102 powers off channel device 115. For example, user 102 may use user device 104 to power off channel device 115 or user 102 may power off channel device 115 by pressing a button on channel device 115. Once channel device 115 is powered off, watch list 135 is revised to include a list of the "most watched" channels associated with the watch list 135. For example, watch list 135 may revert to include the programming channels and rankings it included before user 102 powered on channel device 115. However, in some embodiments, user's 102 viewing session may cause the "most watched" list of channels to change, and watch list 135 may be revised accordingly.

In some embodiments, an immediate previous channel may not be added to watch list 135. For example, an immediate previous channel may not be added to watch list 135 if the channel is viewed for less than a predetermined amount of time (e.g., one second, five seconds, one minute, or any other suitable amount of time). For example, if user 102 is watching channel 1 and quickly changes through channels 2, 3, and 4 to reach channel 5, channels 2, 3, and 4 may not be added to watch list 135, in some embodiments.

Figure 3:
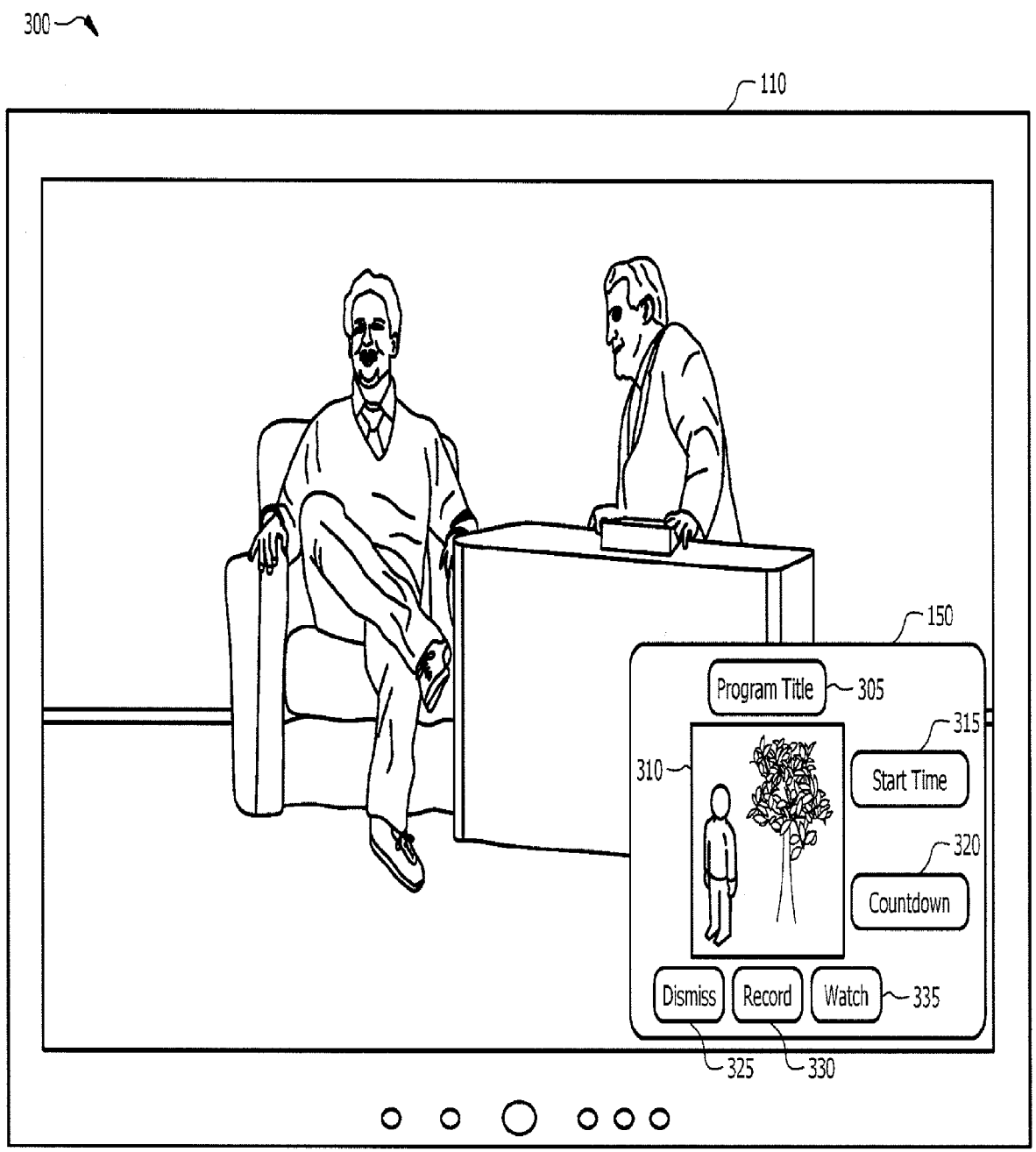
FIG. 3 illustrates a notification of the system of FIG. 1, in certain embodiments.

FIG. 3 illustrates display 110 displaying notification 150, in some embodiments. As illustrated in FIG. 3, display 110 may display program 300. Program 300 represents a program currently displayed by display 110. When display 110 receives notification 150, notification 150 is displayed on display 110. In the illustrated embodiment, notification 150 is displayed on top of program 300. Notification 150 may be displayed on a small section of display 100, allowing user 102 to continue to view program 300, in some embodiments. As illustrated, notification 150 is displayed in the bottom right corner of display 110. Notification 150 may be displayed on any portion of display 110.

In the illustrated embodiment, notification 150 includes program title 305, image 310, start time 315, countdown 320, dismiss option 325, record option 330, and watch option 335. Program title 305 indicates the title of the program associated with notification 150. For example, program title 305 may indicate the name of a program that is scheduled to begin. Start time 315 indicates the time the program is scheduled to begin. For example, start time 315 may display 9:00 p.m., when the program associated with notification is scheduled to begin at 9:00 p.m. Countdown 320 displays a numerical countdown of the time left before the program is scheduled to begin. For example, if a program is scheduled to begin in three minutes, countdown 320 may include "3:00." Countdown 320 may tick down every second until the program begins (e.g., 2:59, 2:58, etc.). Countdown 320 may include minutes, seconds, milliseconds, and/or any other suitable measure of time.

Notification 150 may also include image 310. Image 310 is generally an image that indicates the program associated with notification 150. For example, image 310 may include one or more cast members of the program, or any other suitable image that facilitates identifying the program. In some embodiments, image 310 may be a video image. For example, if a program has started, image 310 may include a live stream of the program.

Notification 150 may solicit input from user 102. For example, notification 150 may include dismiss option 325, record option 330, and watch option 335. User 102 may use user device 104 to select one or more of the options to provide input to channel device 115. For example, user device 104 may communicate information to channel device 115 and/or display 110 to select one of the inputs. User 102 may depress a button on user device 104 associated with dismiss option 325, record option 330, or watch option 335. Dismiss option 325 generally dismisses notification 150. For example, if user 102 depresses a button associated with dismiss option 325, notification 150 is removed from display 110. Once notification 150 is removed, program 300 may be displayed on all or substantially all of display 110. In some embodiments, an additional notification 150 is displayed once user 102 dismisses the first notification. Record option 330 is generally a command to record the program associated with notification 150. For example, user 102 may wish to continue watching program 300, but may wish to watch the program associated with notification 150 at a later time. Notification 150 facilitates recording the program for user 102 to watch at a later time. The program is stored within memory 145, in some embodiments. User 102 may select watch option 335 to tune into the program associated with notification 150. For example, when user 102 selects watch option 335, channel device 115 may change the channel to the channel associated with notification 150.

Modifications, additions, or omissions may be made to notification 150 without departing from the scope of the disclosure. For example, display 110 may display some, none, or all of the information illustrated in FIG. 3. Display 110 may display information in addition to the information illustrated in FIG. 3.

Figure 4:
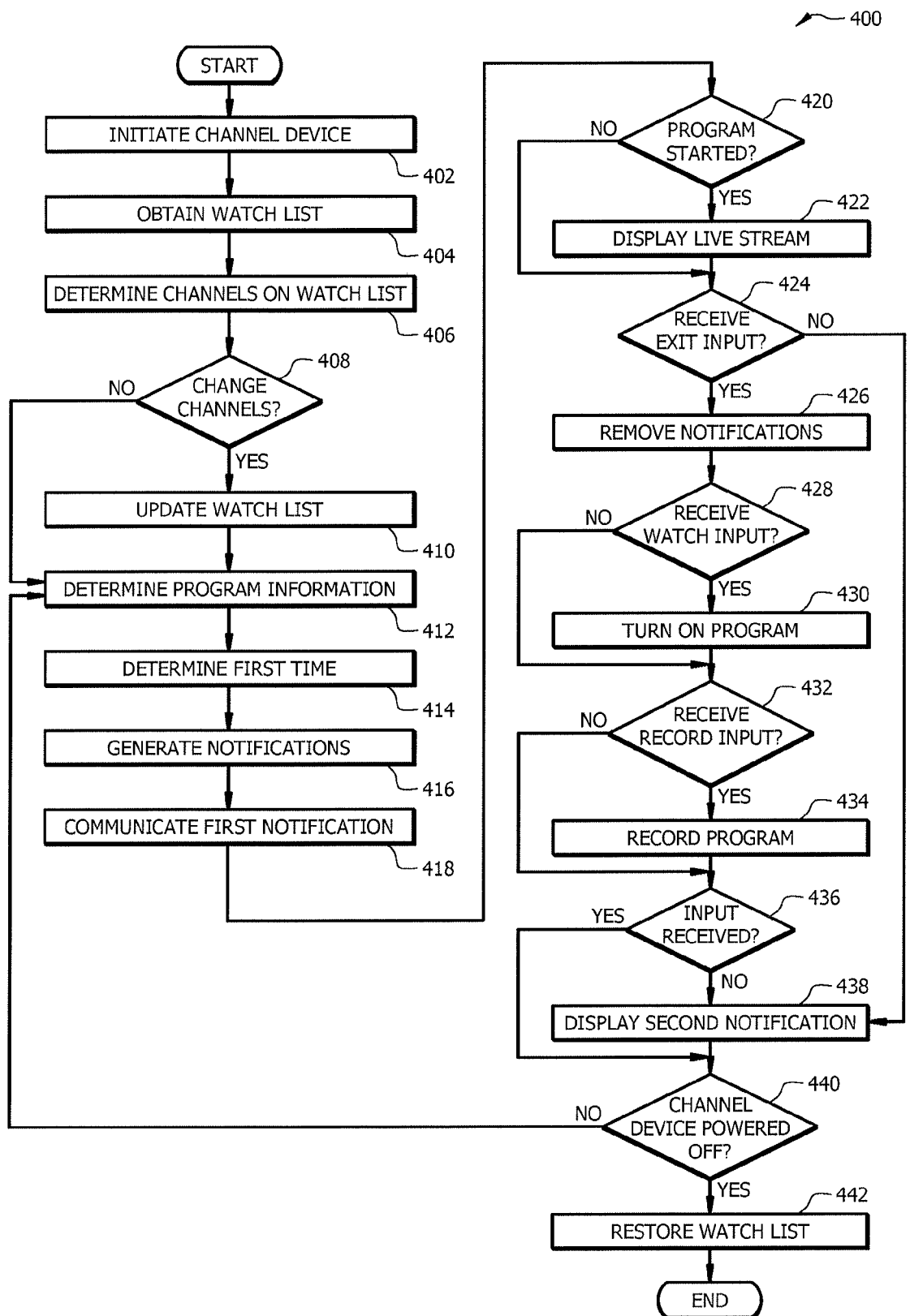
FIG. 4 is a flowchart illustrating a method for communicating program notifications using the system of FIG. 1.

FIG. 4 is a flowchart illustrating a method 400 for communicating program notifications 150 using system 100 of FIG. 1. In some embodiments, channel device 115 communicates notifications 150 to display 110. Method 400 begins at step 402 where user 102 initiates channel device 115. For example, user 102 may use user device 104 to power on channel device 115. Channel device 115 obtains watch list 135 at step 404. Channel device 115 may obtain watch list 135 from memory 145. In some embodiments, channel device 115 obtains watch list 135 from database 120. At step 406, channel device 115 determines the channels on watch list 135. As previously discussed, watch list 135 may include a plurality of channels. Channel device 115 may determine each of the plurality of channels on watch list 135. Each of the channels may be ranked using a numerical number.

Channel device 115 determines that a channel is changed at step 408. For example, Channel device 115 may facilitate changing the channel from a previous channel to a current channel. For example, user 102 may utilize user device 104 to communicate a command to channel device 115 and/or display 110 to change the programming channel. Channel device 115 may receive the command and communicate audio and/or video information for the current channel to display 110 for display.

Upon a determination that display 110 is displaying the current channel, channel device 115 dynamically revises watch list 135 at step 410. For example, if the previous channel was not on watch list 135, channel device 115 updates watch list 135 to include the previous channel. In this example, the previous channel is the highest ranked channel, and the lowest ranked channel is removed from watch list 135. If the previous channel was already included in watch list 135, channel device 115 changes the rankings of the channels to associate the highest ranking with the previous channel. In some embodiments, channel device 115 continues to dynamically revise watch list 135 as the channels are changed.

Channel device 115 may determine program information 160 for all or part of the programming channels on watch list 135 at step 412. As previously discussed, program information 160 includes scheduled programming for a program channel. Program information 160 may also include the title of the scheduled programs and a start time for the scheduled programs indicating the scheduled time that the programs begin. Channel device 115 determines a first time to communicate notification 150 to display 110 at step 414. As discussed, channel device 115 may communicate notification 150 to display 110 at a predetermined time before a program on a channel on watch list 135 is scheduled to begin. For example, channel device 115 may generate notification 150 at a default period of time before a program is scheduled to begin. As another example, user 102 may provide input to indicate a time to generate notification 150. Channel device 115 may determine the first time by using program information 160 to determine the start time of a program and subtracting the predetermined amount of time from the start time.

Channel device 115 generates notifications 150 at step 416. For example, channel device 115 may generate a notification for each of the programs that is scheduled to begin at the predetermined amount of time. Channel device 115 communicates notifications 150 to display 110 for display. Channel device 115 communicates first notification 150 to display 110 at step 418. Channel device 115 may generate and communicate a plurality of notifications 150 for display, wherein each notification 150 is associated with a channel. In some embodiments, channel device 115 determines the order to display notifications 150 by the rank of the channels in watch list 135.

At step 420, channel device 115 determines whether the program associated with first notification 150 has started. For example, channel device 115 determines the current time and determines whether the current time is past the scheduled starting time for the program. Upon a determination that the current time has passed the scheduled starting time for the program, channel device 115 generates a live stream of the program for display in notification 150. If the scheduled program has not begun, the method proceeds to step 424.

Channel device 115 determines whether it receives dismiss input at step 424. As discussed, user 102 may respond to first notification 150 using device 104 to indicate to dismiss notification. If channel device 115 determines that it received dismiss input, channel device 115 removes first notification 150 at step 426 before proceeding, otherwise method 400 proceeds to step 438.

Channel device 115 determines whether it receives watch input at step 428. As discussed, user 102 may respond to notification 150 using device 104 to indicate watching the program associated with first notification 150. If channel device 115 determines that it received watch input, channel device 115 communicates audio and/or video information for the program associated with the first notification 150 to display 110 for display at step 430. Otherwise, method 400 proceeds to step 432.

Channel device 115 determines whether it receives record input at step 432. As discussed, user 102 may respond to notification 150 using device 104 to indicate to record the program associated with the first notification 150. If channel device 115 determines that it received record input, channel device 115 facilitates recording the programming at step 434. The program may be recorded and stored in memory 145, database 120, and/or any other suitable location. If channel device 115 does not receive record input at step 432, the method proceeds to step 436.

Channel device 115 determines whether any input is received within a predetermined amount of time at step 436. Display 110 may display first notification 150 for a predetermined amount of time (e.g., 30 seconds, 1 minute, 5 minutes, or any other suitable amount of time). If input is not received within the predetermined amount of time, first notification 150 may be removed before proceedings to step 438 where display 110 displays the second notification 150. Otherwise, method 400 proceeds to step 440.

At step 440, channel device 115 determines whether channel device 115 is powered off. If channel device 115 is not powered off, method 400 proceeds to step 412. If channel device 115 is powered off at step 440, the method proceeds to step 442 where channel device 115 and/or any other suitable component restores watch list 135 to include the "most watched" channels. As discussed, method 400 begins with watch list 135 including the "most watched" channels. However, as user 102 changes the channels, watch list 135 is revised to include channels that may not be a "most watched" channel. After channel device 115 is powered off at step 440, channel device 115 and/or any other suitable device determines the "most watched" channels and revises watch list 135 to include the most watch channels. The restored watch list 135 may be identical to watch list 135 obtained at step 404. In some embodiments, user 102's use of channel device 115 during method 400 may have modified the "most watched" channels. Thus, watch list 135 may include channels that were not included when channel device 115 obtained the watch list at 404. After channel device 115 restores watch list 135 at step 442, method 400 ends.

Modifications, additions, or omissions may be made to method 400 depicted in FIG. 4. Method 400 may include more, fewer, or other steps. For example, channel device 115 may not monitor channel changes and may not revise watch list 135 at steps 408 and 410. For example, steps may be performed in parallel or in any suitable order. While discussed as specific components completing the steps of method 400, any suitable component of system 100 may perform any step of method 400. As another example, method 400 describes channel device 115 generating two notifications 150. Channel device 115 may generate one notification 150, or any other suitable number of notifications 150. In the embodiment, when channel device 115 generates more than two notifications 150, method 400 may continue to display, remove, and receive input for one or more of the additional notifications 150. In the embodiment when channel device 115 generates a single notification 150, method 400 may not perform displaying the second notification 150 at step 438.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A channel device, comprising:
   a memory configured to store a watch list, the watch list comprising n predetermined number of channels, wherein n is an integer and wherein the predetermined number of channels are ranked from one to n; and
   a processor configured to:
      obtain the watch list from a network database;
      determine a change from a first program of a first channel to a second program of a second channel;
      determine a display time associated with the first channel;
      determine whether the display time associated with the first channel meets or exceeds a threshold amount of time;
      determine that the first channel is in the watch list;
      in response to a determination that the display time associated with the first channel meets or exceeds the threshold amount of time, update a rank of the first channel in the watch list to be one, wherein no channels are removed from the watch list;
      identify a start of a third program on the first channel; and
      display a notification overlaid on a section of the second program, wherein the notification includes a video of the third program.

2. The channel device of claim 1, wherein to display the notification, the processor is further configured to:
   determine program information for the program on the first channel;
   determine a display time to display the notification, wherein the display time is a threshold amount of time before a start time of the program; and
   generate the notification for display at the display time, the notification including at least a title and the start time of the program.

3. The channel device of claim 2, wherein:
   the program is a first program;
   the notification is a first notification; and
   the processor is further configured to:
      determine program information for a second program on a second channel;
      determine that an input in response to the first notification is not received for a threshold amount of time; and
      upon a determination that the input is not received for the threshold amount of time, generate a second notification for display that indicates at least a title and a start time of the second program.

4. The channel device of claim 3, wherein the first notification and the second notification each further include one or more of the following:
   a request for user input; and
   commands for a user to respond to the notification.

5. The channel device of claim 1, wherein the processor is further configured to determine that the first channel has been watched at least a predetermined number of times, wherein updating the rank of the first channel is additionally responsive to the determination that the first channel has been watched at least the predetermined number of times.

6. The channel device of claim 1, wherein the first channel was ranked a first value before being reranked, further including a third channel in the watch list ranked a second value before the first channel was reranked, wherein the second value is less than the first value and both the first and second values are less than n, wherein the processor is further configured to, in response to updating the rank of the first channel to be one, update a rank of the third channel to be the second value plus one.

7. The channel device of claim 6, wherein the processor is further configured to store the updated rankings of the first channel and the third channel in the network database upon a determination that the channel device is powered off.

8. The channel device of claim 1, wherein the watch list includes a plurality of channel lists associated with a respective plurality of users.

9. A method, comprising:
   storing a watch list, the watch list comprising n predetermined number of channels, wherein n is an integer and wherein the predetermined number of channels are ranked from one to n;
   obtaining the watch list from a network database;
   determining a change from a first program of a first channel to a second program of a second channel;
   determining a display time associated with the first channel;

determining whether the display time associated with the first channel meets or exceeds a threshold amount of time;

determining that the first channel is in the watch list;

in response to a determination that the display time associated with the first channel meets or exceeds the threshold amount of time, updating the rank of the first channel in the watch list to be one, wherein no channels are removed from the watch list;

identifying a start of a third program on the first channel; and displaying a notification overlaid on a section of the second program, wherein the notification includes a video of the third program.

10. The method of claim 9, wherein displaying the notification further includes:

determining program information for the program on the first channel;

determining a display time to display the notification, wherein the display time is a threshold amount of time before a start time of the program; and generating the notification for display at the display time, the notification including at least a title and the start time of the program.

11. The method of claim 10, wherein:

the program is a first program;

the notification is a first notification; and the method further includes:

determining program information for a second program on a second channel;

determining that an input in response to the first notification is not received for a threshold amount of time; and upon a determination that the input is not received for the threshold amount of time, generating a second notification for display that indicates at least a title and a start time of the second program.

12. The method of claim 11, wherein the first notification and the second notification each further include one or more of the following:

a request for user input; and commands for a user to respond to the notification.

13. The method of claim 9, further including determining that the first channel has been watched at least a predetermined number of times, wherein updating the rank of the first channel is additionally responsive to the determination that the first channel has been watched at least the predetermined number of times.

14. The method of claim 9, wherein the first channel was ranked a first value before being reranked, further including a third channel in the watch list ranked a second value before the first channel was reranked, wherein the second value is less than the first value and both the first and second values are less than n, further including, in response to updating the rank of the first channel to be one, updating the rank of the third channel to be the second value plus one.

15. The method of claim 14, further including storing the updated rankings of the first channel and the third channel in the network database upon a determination that a channel device is powered off.

16. The method of claim 9, wherein the watch list includes a plurality of channel lists associated with a respective plurality of users.

17. A non-transitory computer-readable medium comprising instructions that, when executed, cause at least one processor to at least:

store a watch list, the watch list comprising n predetermined number of channels, wherein n is an integer and wherein the predetermined number of channels are ranked from one to n;

obtain the watch list from a network database;

determine a change from a first program of a first channel to a second program of a second channel;

determine a display time associated with the first channel;

determine whether the display time associated with the first channel meets or exceeds a threshold amount of time;

determine that the first channel is in the watch list;

in response to a determination that the display time associated with the first channel meets or exceeds the threshold amount of time, update a rank of the first channel in the watch list to be one, wherein no channels are removed from the watch list;

identify a start of a third program on the first channel; and display a notification overlaid on a section of the second program, wherein the notification includes a video of the third program.

18. The non-transitory computer readable medium of claim 17, wherein to display the notification, the instructions, when executed, cause the at least one processor to:

determine program information for the program on the first channel;

determine a display time to display the notification, wherein the display time is a threshold amount of time before a start time of the program; and generate the notification for display at the display time, the notification including at least a title and the start time of the program.

19. The non-transitory computer readable medium of claim 18, wherein:

the program is a first program;

the notification is a first notification; and the instructions, when executed, cause the at least one processor to at least:

determine program information for a second program on a second channel;

determine that an input in response to the first notification is not received for a threshold amount of time; and upon a determination that the input is not received for the threshold amount of time, generate a second notification for display that indicates at least a title and a start time of the second program.

20. The non-transitory computer readable medium of claim 19, wherein the first notification and the second notification each further include one or more of the following:

a request for user input; and commands for a user to respond to the notification.

21. The non-transitory computer readable medium of claim 17, wherein the instructions, when executed, cause the at least one processor to at least determine that the first channel has been watched at least a predetermined number of times, wherein updating the rank of the first channel is additionally responsive to the determination that the first channel has been watched at least the predetermined number of times.

22. The non-transitory computer readable medium of claim 17, wherein the first channel was ranked a first value before being reranked, further including a third channel in the watch list ranked a second value before the first channel was reranked, wherein the second value is less than the first value and both the first and second values are less than n, wherein the instructions, when executed, cause the at least one processor to, in response to updating the rank of the first channel to be one, update a rank of the third channel to be the second value plus one.

23. The non-transitory computer readable medium of claim 22, wherein the instructions, when executed, cause the at least one processor to at least store the updated rankings of the first channel and the third channel in the network database upon a determination that a channel device is powered off.

24. The non-transitory computer readable medium of claim 17, wherein the watch list includes a plurality of channel lists associated with a respective plurality of users.

* * * * *